Patented Mar. 19, 1935

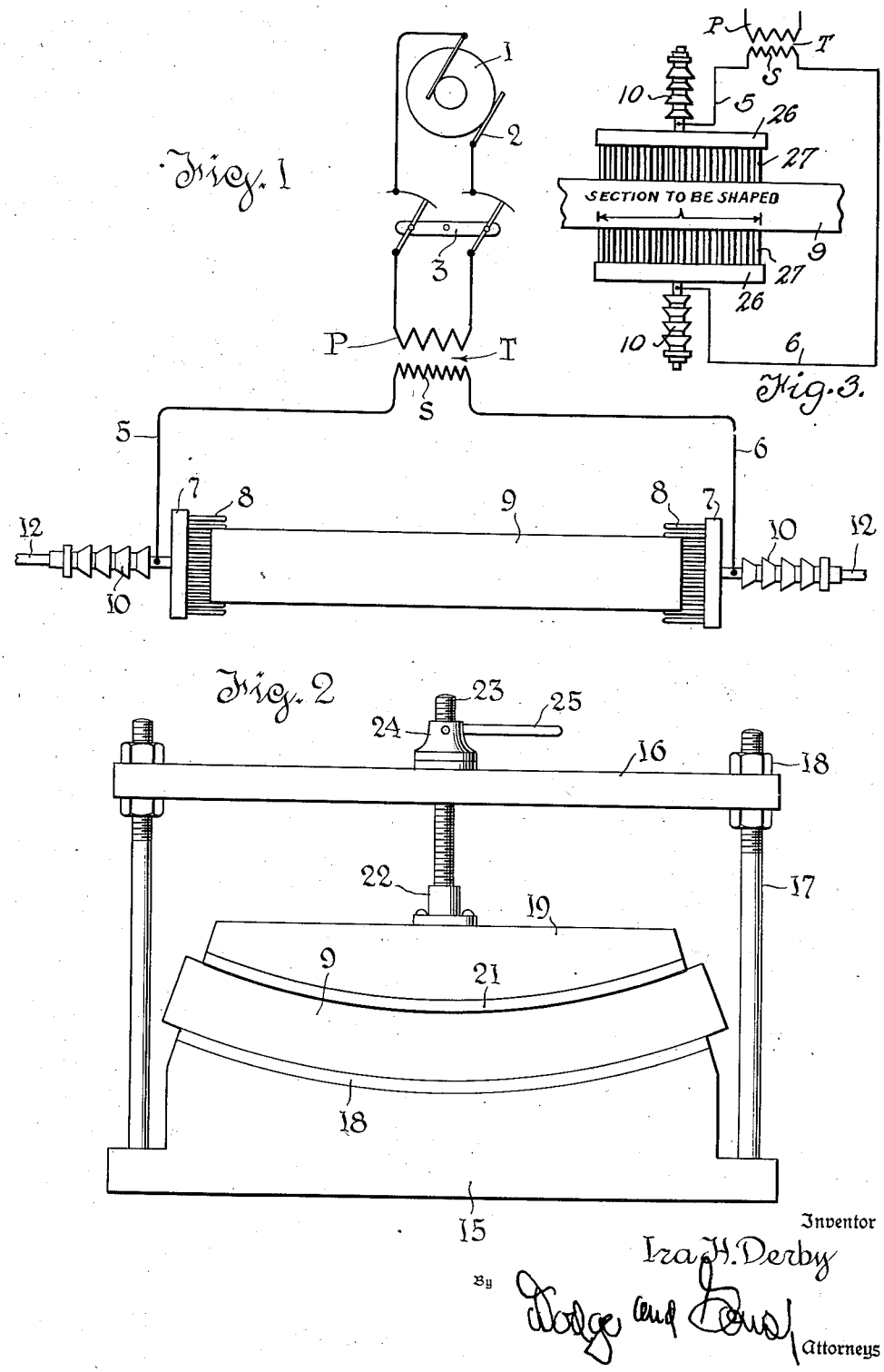

1,994,607

UNITED STATES PATENT OFFICE 1,994,607

ELECTROTHERMIC PROCESS OF SHAPING WOOD

Ira H. Derby, Indianapolis, Ind., assignor to Peter C. Reilly, Indianapolis, Ind.

Application January 28, 1933, Serial No. 654,035

6 Claims. (Cl. 144—271)

This invention relates to an electrothermic process of shaping, bending or molding wood, and constitutes a continuation in part of my prior application, Serial No. 361,524, filed May 8, 1929, now Patent No. 1,899,233, issued February 28, 1933.

In that application, there is described and claimed a process of drying or seasoning green wood by applying a high difference of potential between opposite faces of a body of wood so as to raise the temperature of the wood substantially uniformly throughout its cross section until the entrained moisture is expelled by evaporation and transpiration. This evaporating or drying process subjects the woody cells to steam pressure and facilitates the escape of the moisture from the interior of the wood body outwardly.

One of the important advantages of the invention described in the application referred to above, was in materially reducing the time required for seasoning wood, as well as to prevent cracking, checking and disruption of the fibers, which is incidental to the ordinary seasoning process. In that application, it was proposed to establish an electrical potential difference between opposing faces of the wood over a substantial area of its surface, by passing the electric current in a direction parallel to or across the grain of the wood. In most cases, it was found preferable to pass the current parallel to the wood fibers because of the smaller resistance encountered in this direction.

When an electrical potential is applied in this manner the electrical energy is largely converted into heat according to the well known equation:

$$H = KC^2R = KCE = K\frac{E^2}{R}$$

(where H equals heat units; C equals current in amperes; R equals resistance in ohms; E equals electromotive force in volts; and K is a reduction factor).

By that process the current may be regulated properly so as to raise the temperature of the entire mass of material to the evaporation temperature of the moisture, thereby causing this moisture to be evaporated and expelled with extreme rapidity.

The above method of heating is also applicable to bending, shaping or molding wood into various irregular forms. If it is desired to use green wood or partially seasoned wood, the current is applied to the material until the free moisture is substantially removed by evaporation and the wood fibers are uniformly softened throughout. When the entire mass is plastic and flexible it may be shaped and held in any desired irregular shape.

After shaping, the heating process may be continued with the wood in a mold or press until the material is entirely dry or the material may be held in its shaped position while the temperature is allowed to fall to normal. Ordinarily, the process of shaping timbers is carried out by heating and softening the wood in steam for several hours before it is shaped or molded. After the molding process, it is then held in its new form and allowed to cool and dry. By my process, the length of time required for such operations is materially reduced.

In the prior art, the slow processes of bending and shaping wood have been used to give the advantage of having a finished article made up of a single piece of wood in its natural state; that is, the wood fibers are parallel or substantially so to the length of the article. This avoids the weakening which results from carving out articles of irregular shape from a solid block of wood, since such cutting nearly always results in the finished article being "cross grained", and having much less strength than an article made from a single integral piece of wood.

Such processes have heretofore been so time-consuming that the expense involved was prohibitive in many cases. The present method overcomes substantially all of the difficulties heretofore met and results in a superior product being obtained.

The novelty in the present process resides in the method of applying heat to the wood object to be shaped. In such heating, the wood must necessarily possess a substantial degree of electrical conductivity and be in a more or less damp or moist condition, since dry wood is a very good electrical and thermal insulator. The heat is developed substantially uniformly throughout the wood mass, and the temperature rises substantially as rapidly in the center of the body as at the periphery. This obviates the necessity of slowly conducting the heat from a remote point through the very poorly conducting wood to the center, as in the ordinary methods of heating by steam.

In the electrical heating process, the time required for putting the wood in proper condition is very short and depends only on the power available and the applied electrical potential which determines the rate of input of energy into the wood. As in the old process, the material must be kept under pressure of the deforming force until it has cooled and seasoned or dried to a substantial degree.

If dry wood is the starting material, it must be moistened thoroughly with water before being heated. If green wood is to be treated, preliminary moistening by water soaking while not always essential, may still be of advantage in some cases. Under any conditions, it is essential that the wood to be treated have a proper moisture content, which must amount to above 25% by weight of that of the wood to insure the presence of free liquid on the walls of the wood fibers.

Green wood is a good conductor of electricity and has a low resistance while wood that has been dried to a condition below the fiber saturation point, which is approximately 25% of moisture in the wood, has a very high resistance and when the moisture is removed down to a point of 10 to 15% moisture content, the wood becomes a perfect insulator.

Enough moisture must be present so that in the operation of heating the wood at least the fiber saturation moisture remains at the end of the heating operation when the wood is transferred to the mechanism for bending or shaping. If too little moisture is present, so that in the operation of heating the moisture content drops below that of the fiber saturation point, the resistance of the body rises so rapidly that it becomes difficult to properly condition the material. A certain conditioning time is required to put the wood fiber in a soft and plastic condition such that it may be bent readily without rupturing of the fiber structure.

In connection with the addition of this moisture, it should be pointed out that the moisture removed by evaporation in the heating process is what may be termed "free moisture". This is sharply distinct from the "fiber saturation moisture" which is present in green wood in its natural state.

The large surface area of wood to be treated must be in intimate contact with the electrodes. Consequently, use may be made of an electrode which is either liquid or plastic; mercury being one form of liquid electrode which is suitable. Other forms of liquid electrodes might comprise aqueous conducting solutions of various chemical salts.

The applied potential should be of the order of 1000 volts or more, and above a certain predetermined minimum the rate of heating depends, of course, upon the power input. The characteristics of the current employed may vary and use may be made of direct current, or alternating current of any desired low frequency. The rate must not, however, be sufficient to cause such rapid evaporation of the moisture as to disrupt or destroy the wood fibers. Consequently, it is desirable that the heating be conducted in a gradual manner so as to render the fibers soft and plastic by the time the desired temperature of the wood has been attained, which temperature is that of the boiling point of water.

If the heating process is carried out with extreme rapidity, the current must be cut down when the boiling temperature is reached and the temperature maintained long enough to produce a satisfactory softening of the wood structure before the shaping process is completed.

Inasmuch as the heating of the body of wood to the evaporation temperature is the time-consuming part of the ordinary process of steam treating, it may be desirable to combine the old method with the present method. Under such circumstances the wood would be heated to the boiling point of water by electrical means and then transferred to a steam chamber for conditioning and further softening before bending. In this way the entire process could be carried out quickly without the loss of time previously involved in waiting for equalization of temperature between the outer and inner parts of the wood body.

In the shaping and forming apparatus, it is desirable that provisions be made for continuing the heating by electrical means while the wood is in the mold or press, although this is not essential. In any case, however, the wood must be allowed to remain under its distorting forces until it is thoroughly cooled and the structure has adjusted itself to the new contour. Slow cooling is desirable, because it permits the stresses and strains brought about by the deformation of the wood to be gradually relieved by the plastic flow of the material.

Although processes embodying this invention are capable of being carried out by various forms of apparatus, the invention will be better understood by reference to the drawing in connection with the specification.

In the accompanying drawing:—

Fig. 1 is a diagrammatic view showing one form of apparatus adapted for subjecting blocks of wood to differences of electric potential;

Fig. 2 is an elevation of one form of shaping or molding apparatus which may be used in connection with processes embodying my invention; and Fig. 3 is a diagrammatic view showing apparatus adapted for subjecting bodies of wood to differences of electrical potential over a section which is to be shaped.

Referring to Fig. 1 of the drawing, the reference character 1 designates a suitable source of high voltage electricity, here shown as a generator of the alternating current type, although a direct current source may also be used. This machine supplies current from brushes 2 through a switch 3 to the primary P of a step-up transformer T. The secondary S of this transformer is connected to electrodes 7 by means of line wires 5 and 6. When a unidirectional current is employed it is best obtained by rectifying the high voltage alternating current by any of the well known means.

In carrying out this process, it is necessary that the electrodes be freely pervious to gases and vapors so as to allow their ready escape and for this purpose each of the electrodes 7 comprises a body portion of electrically conductive material carrying a series of metallic bristles 8 covering the entire surface thereof at closely spaced intervals. Each of these electrodes is rigidly connected to a bank of insulators 10 which are in turn attached to a suitable supporting rod 12. Any suitable supporting means may be provided for the rods 12.

Mounted between the two electrodes 7 and contacting closely with the extending ends of bristles 8 is a body of wood 9 to be treated. It will be clear that electrodes 7 and block 9 complete the secondary circuit of transformer T, but that due to the presence of the two banks of insulators 10, the current is confined to this circuit.

Although I have shown the electrodes 7 as carrying a series of metallic bristles 8, this particular structure is merely illustrative since the only requirement is that each electrode shall contact with the high resistance material at a great number of closely spaced points, and that the current pass through practically the entire cross sectional area of the material to be treated and cause a temperature rise throughout this material.

When this block 9 is placed in position between the two electrodes 7, the bristles 8 are forced into very close electrically conducting contact with the ends of the block. With the switch 3 closed, high voltage alternating current is supplied to these electrodes and circulates through the secondary circuit of transformer T, this circuit being completed by the block 9. The block 9 may be weighed prior to the starting of the process and it may be removed and weighed at suitable intervals during the process, in order to determine definitely when the desired condition is reached, provided exterior examination is insufficient.

After one block has been heated and its condition ascertained by weighing, other blocks of substantially the same size and condition may be subjected to the action of the current in the same way and the weighing dispensed with.

The apparatus shown in Fig. 1 is capable of being used for heating the wood prior to its shaping. Likewise, this apparatus may be applied to the material while it is in a press or mold, so as to complete the heating and drying while the wood is under deformation.

One form of press is shown by way of example in Fig. 2. This press comprises a base 15 terminating at the top in a block having a curved shaping surface 18 adapted to engage the block 9, and cooperating with a top block 19 having a curved article-engaging surface 21. The base 15 carries a plurality of spaced uprights 17 to which is secured, as by nuts 18 threaded to the uprights, a bar 16 which is adapted to support the top block 19 and to permit it to be forced under pressure against the article to be shaped. Accordingly, there is secured to the top block 19 as at 22, a threaded post 23 passing through an opening in the bar 16 and having cooperating with it a nut 24 which may be turned by a handle 25 to either lift the block 19 or to force it downwardly under pressure.

It will be understood that the handle 25 may be manipulated to lift the top block 19 while the body is being placed on the curved surface 18 of the bottom block, and then the handle is rotated in the opposite direction to force the block 19 down against the article 9 until it reaches the deformed position shown.

Since the uprights 17 are in spaced relation, there is ample clearance to permit electrodes 8 to be applied to the ends of the block 9 while it is in deformed position in the press.

While it will be understood that normally the wood to be shaped is heated between the electrodes 8 before being placed in the press, and without the use of a steam chamber, it may in some instances be found desirable to bring the body of wood to a boiling temperature by electrical heating and then to place it in a steam chamber for a substantial time, in order to carry out the softening of fibers which are particularly resistant. After softening in the steam chamber, the wood may then be put in the press and shaped and either allowed to cool and dry without further application of heat, or it may be heated electrically until it is dried to the proper condition.

In the ordinary steam methods of shaping, and particularly with hard woods, it is necessary to leave the wood in the steam chamber for long periods of time in order that the heating effect may extend to the center of the material. This frequently results in such a softening of the outer fibers that they collapse and are ruptured when the material is placed in a press. The electrical heating process embodied in this application entirely avoids such a result, since the uniformity of the application of the heat is much greater and, hence, fibers at the center of the body become softened at substantially the same time as those at the outside.

In order to show the effectiveness of processes embodying this invention, several specific examples of practical tests will be given:

Example 1.—A piece of green pine 4 x 4 x 24 inches was heated from a current source of 8,000 volts. The piece was then subjected to a bending force which shaped it into an arc with a 3-ft. radius of curvature, and allowed to cool and dry. After the removal of pressure this form was very perfectly retained by the wood and no disruption of fibers or cracking or collapse of the wood structure was visible on the concave or convex surfaces.

Example 2.—A green piece of hard maple 2 x 2 x 30 inches was heated electrically from a current source of 8,000 volts and then immediately subjected to the bending force. With this material a perfect bend was obtained without splitting, collapse or disruption of the body, which bend had a radius of curvature of 20 inches.

Example 3.—The operation described in Example 2 was carried out with a piece of white maple and equally good results obtained.

Although the drawing indicates that the heating effect is obtained by applying the electrodes to the ends of the body to be shaped, it will be obvious that these electrodes may be applied to the sides of the body over the entire section in which deformation is to occur. In the case of long pieces of wood, it may be desirable to localize the heating process at the exact point where bending is to occur and without subjecting the whole body to the operation. In such a way the heating is done by applying the electrodes to opposite faces of the wood and passing the current transversely instead of longitudinally of the fibers. Such a procedure is not only economical in the use of current but it saves time and renders it unnecessary to treat sections of wood which are not subjected to deformation.

One form of apparatus for carrying out the heating process localized over the area where bending or shaping is to be performed is shown diagrammatically in Fig. 3. In this figure, the parts correspond substantially to those shown in Fig. 1, except that the electrodes are in contact with the wood so as to localize the heating effect at the points where deformation is to occur. As shown in Fig. 3, each of the electrodes comprises a body portion 26 of electrically conductive material connected with one of the line wires 5 or 6 and having electrically connected with it a series of metallic bristles 27 covering the entire surface of the body 26 at closely spaced intervals.

The purpose of this arrangement is to apply a difference of electrical potential only to the section of the wood which is to be shaped, and thus not to affect any other portion of the material at all. In this way, unnecessary expenditure of power is avoided, since only the part which actually needs it is treated and the electric current is localized so as to act more quickly and effectively.

With long pieces of timber, several sections could be thus treated with substantial economy in both time and power, and without affecting in any way the sections of wood which are to remain in the undeformed condition.

It is to be understood that the apparatus shown for carrying out this method is merely illlustrative and that various other forms of apparatus may be adapted as conditions may dictate. Accordingly, it is not desired that any limitation be placed on the invention, other than is required by the disclosures of the prior art.

What is claimed is:

1. The process of shaping wood containing substantial quantities of volatile matter, which consists in establishing an electrical potential difference in excess of one thousand volts between opposed surfaces of a body of wood over a substantial cross sectional area thereof, maintaining such potential difference until the temperature of the volatile matter is raised to the boiling point and the free moisture is substantially removed by evaporation, shaping the material while its temperature is elevated, and then holding it in shaped position and maintaining the potential difference until the body is capable of maintaining its shaped form when released.

2. The process of shaping moist wood, comprising the steps of establishing a high electrical potential difference between opposed surfaces of a body of wood over a substantial cross sectional area thereof, maintaining such potential difference until the temperature of the body is raised to the boiling point of the moisture and the free moisture is substantially removed by evaporation, shaping the material while the temperature is elevated, and holding the material in shaped position without further application of heat while it is allowed to cool to ambient temperature.

3. The process of shaping dry wood, which process consists in increasing the moisture content of the wood until the moisture comprises more than twenty-five per cent by weight of the wood, applying a potential difference in excess of one thousand volts to opposite faces of the wood body until the temperature of the body is raised to the boiling point of the moisture, continuing the application of the current at reduced voltage until the wood fibers become plastic, shaping the wood, and then continuing the application of current until the body becomes set in its new shape.

4. The process of shaping wood, which process consists in increasing the moisture content of the wood until the moisture comprises more than twenty-five per cent by weight of the wood, applying a potential difference in excess of one thousand volts to opposite faces of the wood body until the temperature of the body is raised to the boiling point of the moisture, continuing the application of current until the wood fibers become plastic, shaping the body, and then allowing the body to cool and dry in its new shape without further application of heat.

5. The method of shaping a body of wood having a longitudinal dimension greatly in excess of its cross sectional dimensions, which method consists in applying a potential difference across the longitudinal dimension of the body, and only at sections where deformation is to take place, continuing such application until the wood fibers become plastic, and then shaping the body.

6. The method of shaping a body of wood having a longitudinal dimension greatly in excess of its cross sectional dimensions, which method consists in applying a potential difference in excess of one thousand volts across the longitudinal dimension of the body, and only at sections where deformation of the wood is to take place, continuing the application of current until the wood fibers in the treated sections become plastic, shaping the body, and then continuing the application of current with the parts under deformation until the body becomes set in its new form.

IRA H. DERBY.